United States Patent

Armstrong et al.

[11] Patent Number: 5,936,722
[45] Date of Patent: *Aug. 10, 1999

[54] APPARATUS AND METHOD FOR DETERMINING THE ANGULAR ORIENTATION OF AN OBJECT

[76] Inventors: Brian S. R. Armstrong, 4107 N. Prospect Ave., Shorewood, Wis. 53211; Karl B. Schmidt, 3049 Lockwood Ter., Sarasota, Fla. 34231

[*] Notice: This patent issued on a continued prosecution application filed under 37 CFR 1.53(d), and is subject to the twenty year patent term provisions of 35 U.S.C. 154(a)(2).

[21] Appl. No.: 08/698,357

[22] Filed: Aug. 15, 1996

[51] Int. Cl.$^6$ .................................................. G01B 11/26
[52] U.S. Cl. ..................................................... 356/139.03
[58] Field of Search ............................. 33/1 M; 250/235, 250/347, 559.37; 356/139.03, 139.05, 139.06, 139.07, 139.08, 141.2, 141.3; 364/559; 473/223, 225, 267

[56] References Cited

U.S. PATENT DOCUMENTS

| | | |
|---|---|---|
| 3,194,563 | 7/1965 | Mackniesh . |
| 3,601,408 | 8/1971 | Wright . |
| 3,697,183 | 10/1972 | Knight et al. . |
| 3,895,366 | 7/1975 | Morris . |
| 4,005,261 | 1/1977 | Sato et al. . |

(List continued on next page.)

FOREIGN PATENT DOCUMENTS 7037968 of 0000 Japan .

OTHER PUBLICATIONS

Laser Focus World, Apr. 1989, V. 25, N. 4, pp. 139–148, "Phase Conjugating Device Detects Alignment Errors" by J.B. Lisson.

Fire Technology, May 1988, V. 24, N. 2, pp. 100–109, "Oblique Orientation Augments UV Detector Coverage Area" by Arturo G. Sancholuz.
Dialog Database Search Result Printout, Dec. 4, 1995 File 4: Inspec (Institution of Electrical Engineers), pp. 1–29.
File 8: Compendex Plus Engineering Info., Inc., pp. 29–45.
File 25: Claims/U.S Patent Abstracts, pp. 45–134.
File 351: Derwent World Patent index, pp. 135–188 Dialog Database Search Result Printout, Jan. 20, 1996.
File 340: Claims, pp. 21–80.
File 6: NTIS, pp. 80–85.
File 8: Compendex Plus, pp. 86–88.
File 2: Inspec, pp. 89–92.
File 434: SciSearch, pp. 92–100.
File 351: Derwent, pp. 100–126.
File 144: Pascal, pp. 129–134.
File 6: NTIS, pp. 134–139.
File 266: Fed. Res. In Progress, pp. 139–142.
File 8: Compendex Plus, pp. 142–156.
File 2: Inspec, pp. 156–160.
File 48: Sport, pp. 160–170.
File 434: SciSearch, pp. 170–184.

(List continued on next page.)

*Primary Examiner*—William L. Oen
*Attorney, Agent, or Firm*—Wolf, Greenfield & Sacks, P.C.; James H. Morris

[57] ABSTRACT

An apparatus and system for determining the angular orientation of an object comprised of a light source directing an optically detectable beam of light at an orientation dependent reflector coupled to an object whereupon a light sensor positioned adjacent the light source detects the reflected optically detectable beam of light from the orientation dependent reflector and determines the centroid of reflection thereon from which the angular orientation of an object throughout a range of rotation about at least one axis of rotation is obtained.

20 Claims, 6 Drawing Sheets

U.S. PATENT DOCUMENTS

| | | |
|---|---|---|
| 4,136,387 | 1/1979 | Sullivan et al. . |
| 4,137,566 | 1/1979 | Haas et al. . |
| 4,146,230 | 3/1979 | Foster . |
| 4,155,555 | 5/1979 | Fink . |
| 4,251,077 | 2/1981 | Pelz et al. . |
| 4,254,956 | 3/1981 | Rusnak . |
| 4,304,406 | 12/1981 | Cromarty . |
| 4,306,723 | 12/1981 | Rusnak . |
| 4,341,384 | 7/1982 | Thackrey . |
| 4,434,654 | 3/1984 | Hulsing et al. . |
| 4,488,173 | 12/1984 | DiMatteo et al. . |
| 4,577,868 | 3/1986 | Kiyonaga . |
| 4,583,862 | 4/1986 | Ferrar et al. . |
| 4,910,410 | 3/1990 | Workman et al. . |
| 5,187,540 | 2/1993 | Morrison et al. . |
| 5,233,544 | 8/1993 | Kobayashi . |
| 5,257,084 | 10/1993 | Marsh . |
| 5,319,577 | 6/1994 | Lee . |
| 5,353,358 | 10/1994 | Baird et al. . |
| 5,453,686 | 9/1995 | Anderson et al. . |

U.S. PATENT DOCUMENTS

File 340: Claims, pp. 187–205.

File 350: Derwent, pp. 205–206.

File 351: Derwent WPI, pp. 206–218.

Pending U.S. Patent Application, Serial No. 08/698,115, filed Aug. 15, 1996, Karl B. Schmidt and Brian S.R. Armstrong, "Orientation Dependent Reflector".

APPARATUS AND METHOD FOR DETERMINING THE ANGULAR ORIENTATION OF AN OBJECT

BACKGROUND OF THE INVENTION

1. Field of the Invention

This invention relates to an apparatus and method for determining orientation, and more particularly, to an apparatus and system for determining the angular orientation of an object throughout a range of rotation about at least one axis of rotation.

2. Description of the Background Art

Presently, there exists many types of optical sensing devices designed to detect orientation of an object. In general, however, the prior art devices designed to determine the orientation of an object are very complex and expensive to manufacture. None of the prior art orientation sensing devices provide for a simple inexpensive means for determining the orientation of an object. Further, many of the prior art devices are highly sensitive to measurement errors.

Some of the prior art devices have achieved orientation sensing through the utilization of transmitted electromagnetic fields, transmitted RF radio signals, computer image processing, computer vision and by way of transmitted optical signals. Representative prior art orientation sensing devices are disclosed in U.S. Pat. Nos. 3,697,183; 4,488,173; 4,583,862; 4,910,410; 5,187,540; 5,319,577; 5,353,358; and 5,453,686; the disclosures of which are hereby incorporated by reference herein.

While the above-referenced prior art orientation devices incorporate a variety of methods to perform orientation measurements of objects, many limitations exist in them such as requiring two-dimensional image processing, requiring a plurality of elements to be placed on the object to be measured, requiring active components to be placed on the object and many of the prior art devices exhibit a high sensitivity to measurement error. A major inadequacy associated with the prior art orientation devices is that they are very complex, difficult to operate, difficult to manufacture and expensive.

Further, many orientation-sensing devices of the prior art are utilized in golf swing training aids. Representative golf swing training aids utilizing optical and various other technologies for sensing aspects, such as orientation or club head speed, associated with the swinging of a golf club are disclosed in U.S. Pat. Nos. 3,194,563; 3,895,366; 4,136,387; 4,137,566; 4,146,230; 4,155,555; 4,251,077; 4,254,956; 4,304,406; 4,341,384; and 5,257,084, the disclosures of which are hereby incorporated by reference herein.

While the above-referenced golf swing training aids of the prior art operate to sense and track orientation and speed in one form or another, none provide a simple and inexpensive means for obtaining instantaneous, highly accurate angular orientation measurements of the golf club head. Accordingly, it was realized that an apparatus and system should be provided for overcoming the inadequacies of the prior art.

Therefore, it is an object of this invention to provide an improvement which overcomes the aforementioned inadequacies of the prior art devices and provides an improvement which is a significant contribution to the advancement of the optical sensing art.

Another object of this invention is to provide an apparatus and system for determining the angular orientation of an object that utilizes an orientation dependent reflector placed on the object for obtaining angular orientation measurements.

Another object of this invention is to provide an apparatus and system for determining the angular orientation of an object that utilizes a combination of orientation dependent and orientation independent reflectors placed on an object to obtain absolute angular orientation measurements.

Another object of this invention is to provide an apparatus and system for determining the angular orientation of an object that utilizes a specular-dome reflector for simultaneously determining angular orientation measurements in two axes of interest.

Another object of this invention is to provide an apparatus and system for determining the angular orientation of an object that utilizes a retro reflector in combination with a specular-dome reflector to obtain instantaneous absolute angular orientation measurements.

Another object of this invention is to provide an apparatus and system for determining the angular orientation of an object that does not require the placement of active components on the object to be measured.

Another object of this invention is to provide an apparatus and system for determining the angular orientation of an object that has substantially reduced error sensitivity.

Another object of this invention is to provide an apparatus and system for determining the angular orientation of an object that permits the range of measurement and sensitivity to be tailored to the needs of a specific application.

Another object of this invention is to provide an apparatus and system for determining the angular orientation of an object that is simple to operate and inexpensive to manufacture.

Another object of this invention is to provide an optical system for determining the angular orientation of an object throughout a range of rotation about at least one axis of rotation, the optical system comprising in combination: an orientation dependent reflection means for providing an optical reflection that varies in position in correspondence to specific orientations about the axis of interest, the orientation dependent reflection means capable of being coupled to the object; a light source means for providing an optically-detectable beam of light, the light source means being positioned at a distance from the orientation dependent reflection means; and a light sensing means for detecting optical reflections on the orientation dependent reflection means so to facilitate the determination of angular orientation, the light sensing means being positioned adjacent the light source means, whereby the light source means projects the optically detectable beam of light towards the orientation dependent reflection means whereupon points of reflection are determined thereon by the light sensing means and the angular orientation of the object is determined.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention comprises an orientation dependent reflector in combination with an orientation independent reflector such that when placed on an object and utilized in a system that further includes a light source means and a light sensing means, the centroids of reflection on the orientation dependent reflector and orientation independent reflector can be determined wherein the distance between the centroids of reflection is calculated and the absolute orientation of the object is obtained.

The orientation dependent reflector is in the form of a specular-dome reflector that includes an exterior curvature such that the reflection of a stationary light source moves on the specular-dome reflector in correspondence to the angular orientation of the object about an axis of interest. Further, retro reflectors are coupled to the specular-dome reflector at two opposing positions so to provide a referent point of reflection.

The orientation dependent reflector utilized herein may, alternatively, be in the form of an arcuate double reflector that provides a reflection having a centroid that moves in correspondence to the angular orientation of the object in one axis of interest. The arcuate double reflector is comprised of an elongated body having an exterior side whereupon first and second angled portions having respective first and second specular reflecting surfaces are coupled thereto such that the first and second specular reflecting surfaces angularly oppose each other and converge to form a right angle therebetween. The first and second specular reflecting surfaces cooperate to then optically reflect light from the light source means so to facilitate the determination of angular orientation of an object.

Similar to the specular-dome reflector, the arcuate double reflector is alternatively used in combination with a retro reflector. Retro reflectors are coupled to the arcuate double reflector at opposing ends of the elongated body. The arcuate double reflector in combination with the retro reflectors operates to obtain absolute angular orientation measurements.

Most importantly, the present invention discloses a method for determining the angular orientation of an object utilizing an orientation dependent reflector alone and in combination with an orientation independent reflector by detecting the centroid of the reflection on the orientation dependent reflector and, therefrom, the angular orientation of the object. The system utilizes, at a minimum, a light source means, a light sensing means and an orientation dependent reflector for determining the angular orientation of an object throughout a range of rotation about at least one axis of interest.

An important feature of the present invention is that an orientation dependent reflector in the form of a specular-dome reflector is utilized in combination with an orientation independent reflector in the form of a retro reflector such that instantaneous angular orientation measurements can be performed in two distinct axes of interest.

Another important feature of the present invention is that an arcuate double reflector is utilized in combination with retro reflectors to obtain instantaneous angular orientation measurements in one axis of interest.

Another important feature of the present invention is that no active components are required to be placed on the object in order to perform angular orientation measurements.

Another important feature of the present invention is that highly accurate angular orientation measurements are performed having a substantially reduced error sensitivity.

Another important feature of the present invention is that the apparatus and system for determining the angular orientation of an object is simple to operate and inexpensive to manufacture.

Therefore, it can be readily appreciated that the present invention overcomes the inadequacies of the prior art and provides a substantial improvement in the optical sensing art.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompanying drawings in which.

Similar reference characters refer to similar parts throughout the several views of the drawings.

DESCRIPTION OF THE PREFERRED EMBODIMENT

Figure 1:
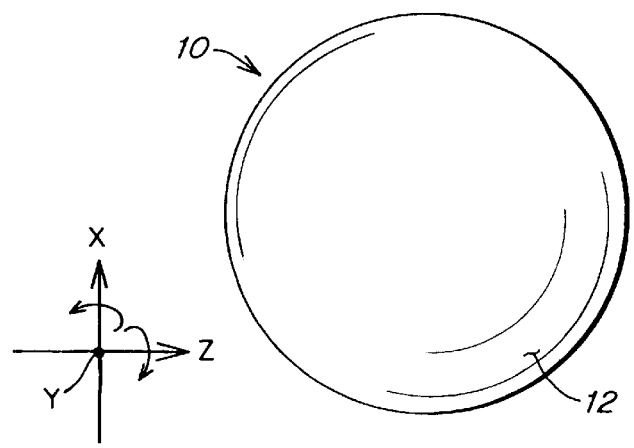
FIG. 1 is a front elevational view of the specular-dome reflector with the relevant axes of rotation oriented wherein rotations along the X and Z axes are capable of being measured.
Figure 2:
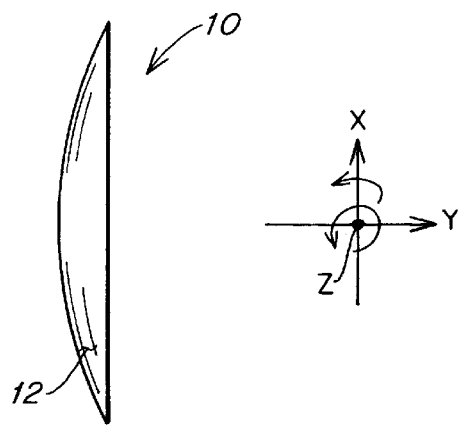
FIG. 2 is a side elevational view of the specular-dome reflector with the relevant axes of rotation depicted.
Figure 3:
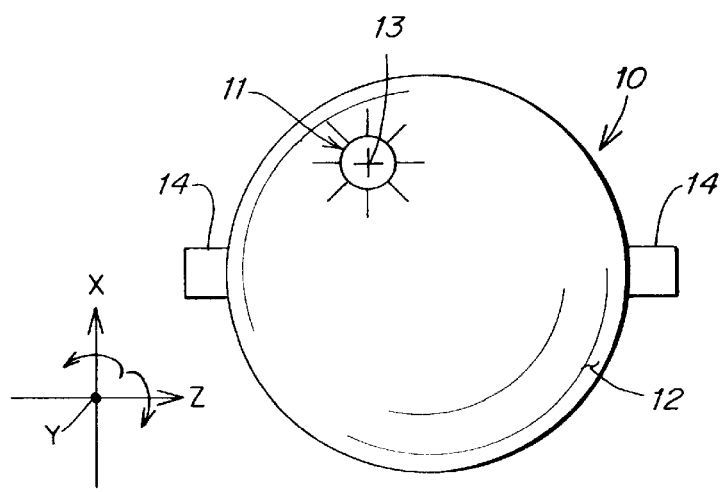
FIG. 3 is a front elevational view of the specular-dome reflector seen in FIGS. 1 and 2 further illustrating the relative positions of additional retro reflectors coupled to the specular-dome reflector and the centroid of reflection on the orientation dependent specular-dome reflector.
Figure 4:
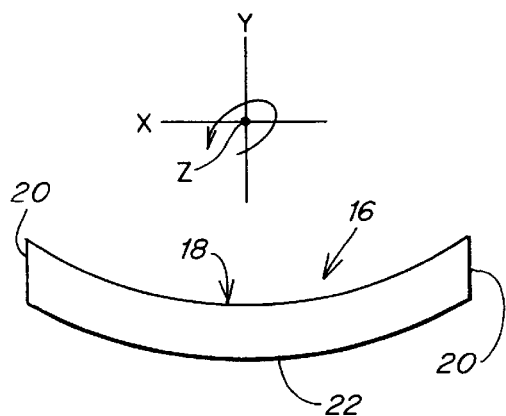
FIG. 4 is a top plan view of the arcuate double reflector illustrating the elongated body, the opposing ends, the exterior side and the relevant axis of rotation for which measurements can be sensed therealong.
Figure 5:
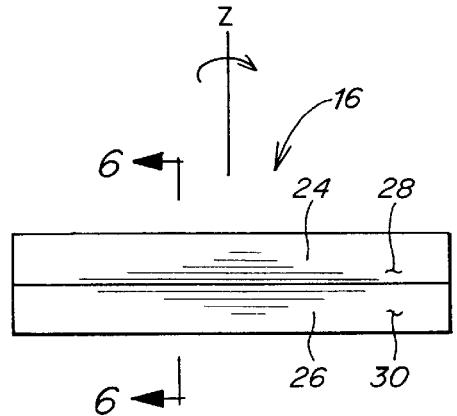
FIG. 5 is a front elevational view of the arcuate double reflector illustrating the elongated body, the first angled portion and the second angled portion in their relative positions to each other along with the relevant axes of rotation for which measurements can be sensed therealong.

In referring to FIGS. 1, 2 and 3, an orientation dependent reflection means is illustrated having two axes of rotation depicted for which angular orientation measurements can be performed. There are many different forms of orientation dependent reflection means currently present in the industry today, however, only a few provide for angular orientation measurement capabilities in more than one axis of rotation.

The specific type of orientation dependent reflection means depicted in FIGS. 1, 2 and 3 is that of a specular-dome reflector 10. The specular-dome reflector 10 can be seen to have an exterior curvature side 12 in the shape of a partial sphere which serves to provide a specular type of reflection. Further, in referring specifically to FIG. 3, the specular-dome reflector 10 can be seen to include retro reflectors 14 coupled adjacent the exterior curvature side 12 with the region over which light is reflected on the specular-dome reflector 10 being shown at 11 and the centroid of that reflection being shown at 13. The retro reflectors 14 can be seen to be coupled to the specular-dome reflector 10 at positions so to oppose one another across the specular-dome reflector 10. Retro reflectors 14 facilitate reflecting light back towards the light source parallel to the direction of arrival of the light. Many types of retro reflectors exist today and it is preferable that the retro reflector 14 utilized herein be of a suitably small construction so to facilitate being used in combination with the specular-dome reflector 10.

Figure 6:
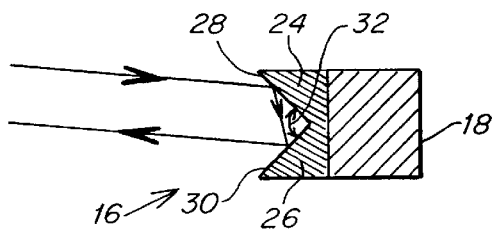
FIG. 6 is a cross-sectional view of the arcuate double reflector taken along line 6—6 as depicted in FIG. 5 illustrating the elongated body, the first angled portion, the second angled portion, the first specular reflecting surface, the second specular reflecting surface and the right angle formed by the first and second angled portions in their relative positions to each other.

In referring now to FIGS. 4, 5, 6 and 7, another form of orientation dependent reflection means is illustrated for which angular orientation measurements can be performed in one axis of rotation, the Z-axis. Illustrated herein, the orientation dependent reflection means is in the form of an arcuate double reflector 16. In referring specifically to FIG. 4, the arcuate double reflector 16 can be seen to include an elongated body 18 having opposing ends 20 and an exterior side 22. Additionally, in referring specifically to FIGS. 5 and 6, the arcuate double reflector 16 can be seen to further include a first angled portion 24 and a second angled portion 26 coupled to the exterior side 22 of the elongated body 18. The first angled portion 24 has a first specular reflecting surface 28 and the second angled portion 26 has a second specular reflecting surface 30 of which angularly oppose each other and converge to form a right angle 32 therebetween. Directional arrows are depicted in FIG. 6 illustrating the path of a reflected optically-detectable beam of light.

Figure 7:
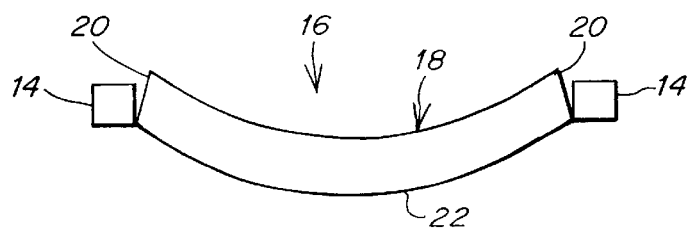
FIG. 7 is a top plan view of the arcuate double reflector illustrating the addition of retro reflectors coupled thereto at the opposing ends.

In referring now to FIG. 7, the arcuate double reflector 16 can be seen to further include an orientation independent reflection means. The orientation independent reflection means is comprised of retro reflectors, generally indicated by reference numeral 14. The retro reflectors 14 are coupled to the opposing ends 20 of the elongated body 18 of the arcuate double reflector 16. The arcuate double reflector 16, in combination with the retro reflectors 14, facilitates the determination of absolute angular orientation of an object relative to an axis of rotation extending perpendicular to the elongated body 18. The retro reflectors 14 used in herein are preferably of a suitably small construction to facilitate use in combination with the arcuate double reflector 16.

In construction, the specular-dome reflector and the arcuate double reflector 16 are preferably formed such that the respective exterior curvature side 12 of the specular-dome reflector 10 and the arcuate nature of the arcuate double reflector 16 are designed to correspond to the range through which orientation will be measured. A larger radii of curvature facilitates performing more sensitive measurements over a small range of rotation and a smaller radii of curvature facilitates performing less sensitive measurements over a large range of rotation. Further, the specular nature of the exterior curvature side 12 and the first and second specular reflecting surfaces 28 and 30 of the arcuate double reflector 16 are formed from material having a sufficiently suitable surface finish so to produce specular reflections.

Now that the structure of the orientation dependent reflection means employed herein in the form of a specular-dome reflector 10 and, alternatively in the form of an arcuate double reflector 16, has been described in detail, their function as utilized in the system of the present invention may now be readily understood.

In general, the movement of an object is comprised of both rotational and translational aspects. This is known as the Screw Theory which was developed in the 19th century and is continually the standard of training in machine design. The Screw Theory describes how the movement of an object can be decomposed into a rotation about an arbitrary chosen center of rotation and a translation of that center of rotation. Hence, the designer of the system of the present invention must select the coordinate frame in which he chooses to express rotation.

The present invention is directed toward orientation sensing and, hence, in order to simplify the explanation of the operation, it is assumed that: (1) rotations are being measured about the front center of a specular-dome reflector 10; and (2) that some other means of determining the translation of the specular-dome reflector 10 is provided (which may be due to the sensing of translation not being required, the translation being sensed by any one of a large number of means known in the art such as a laser range finder, or that the translation variables are determined by the optical system with which the present invention is being practiced).

In explaining the operation of the system for determining the angular orientation of an object throughout a range of rotation about at least one axis of interest, it is necessary for the system to include a light source means for providing an optically detectable beam of light. The light source means is also referred to herein as the light source 36. The light source 36 is designed to project an optically-detectable beam of light towards an orientation dependent reflection means, for which a specular-dome reflector 10 will be used for simplifying the explanation of the system operation.

The light source 36 projects an optically detectable beam of light towards the specular-dome reflector 10 such that a reflection appears thereon which is subsequently detected by a light sensing means. The light sensing means is also referred to herein as the light sensor 38. The light sensor 38 utilized to detect the reflection on the specular-dome reflector 10 is required to be capable of detecting the centroid 13 of reflection on the specular-dome reflector 10. The location of the centroid 13 of reflection on the specular-dome reflector 10 may be detected in several ways. The location of the centroid 13 may be detected by equipping the specular-dome reflector 10 with a light filter such that a sensible property of the reflected beam of light covaries with the centroid 13 of reflection and is subsequently detected with the light sensor 38. The light filter utilized herein is preferably non-uniform in nature. The location of centroid 13 of the reflection may also be determined by detecting the angle of arrival of the reflected beam of light. Examples of sensible optical properties which can be made to covary with the centroid 13 of reflection on the orientation dependent reflection means are polarization and color balance. These properties can be made to vary in a controlled fashion across the area of the orientation dependent reflection means by equipping the orientation dependent reflecting means with a non-uniform polarization or color balance filter (not shown).

However, for simplicity, the determination of the centroid 13 of the reflection will be discussed further using the procedure of detecting of the angle of arrival of the reflected beam of light with the light sensor 38. There presently exists many light sensing means that are capable of detecting the angle of arrival of a reflected beam of light such as a television-type camera, a linear array of photo detectors with appropriate optics, a quad cell or a position-sensitive detector. However, a light sensor 38 in the form of a television-type camera will be considered herein, for simplicity sake, in the explanation of the determination of the angle of arrival of the reflected beam of light.

Figure 8:
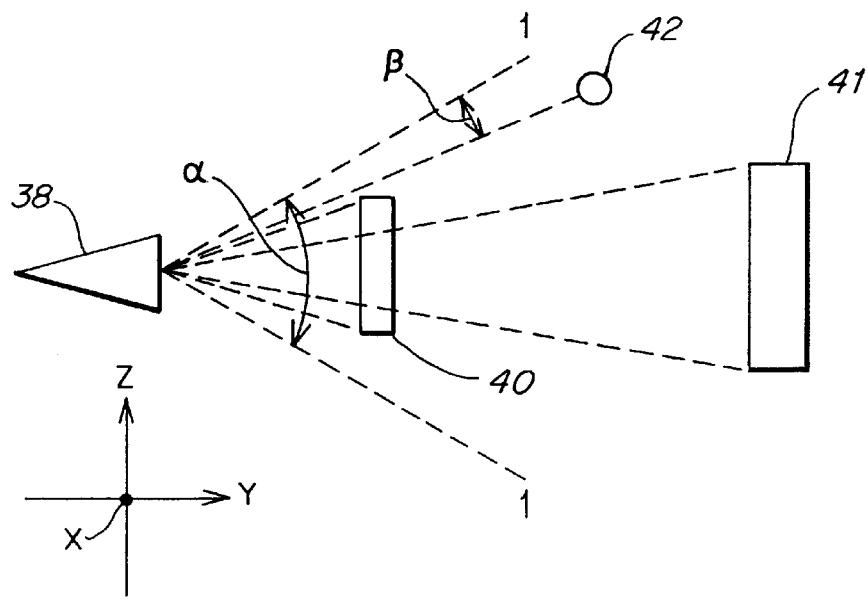
FIG. 8 is a graphical diagram illustrating a light sensor detecting and measuring the angles of arrival for various objects which will aid in the explanation of the present invention.
Figure 9:
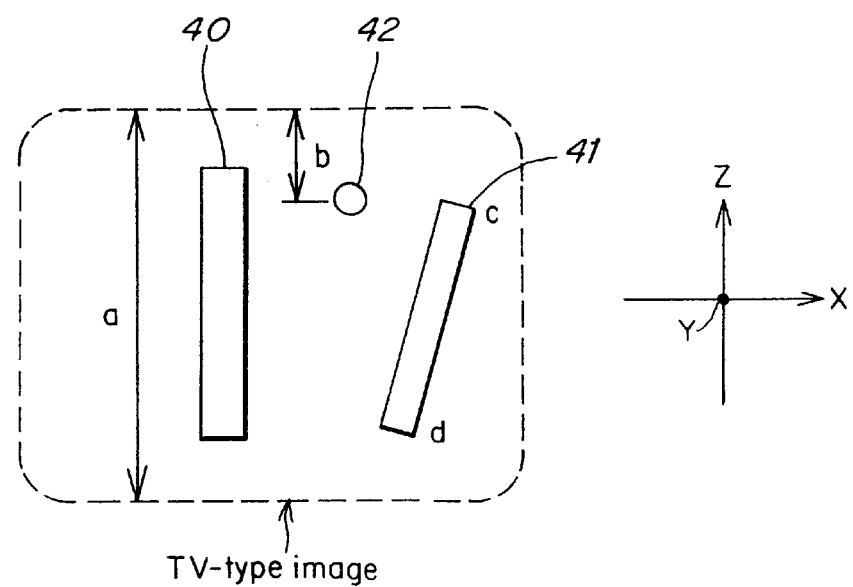
FIG. 9 is a graphical representation of the various objects shown to be detected by the light sensor in FIG. 8 which will aid in the explanation of the present invention.

In referring now to FIGS. 8 and 9, the explanation of the determination of the angle of arrival of a reflected beam of light may be better understood. In FIG. 8, a light sensor 38 in the form of a television camera can be seen sensing three individual objects 40, 41 and 42. It is seen that the apparent sizes of objects 40 and 41 are not determined by their true sizes, but by the angles they subtend from the perspective of the television camera. The full vertical height b of object 42 is proportional to the screen height a, the angle α and the angle of arrival β of a beam of light reflected from object 42. Thus, from this proportional relationship, the angle of arrival β be seen to be represented as:

$$\beta = \alpha(b/a)$$

Therefore, with proper calibration, the angle of arrival of a reflected beam of light from any point in the field of view can be measured with respect to any desired reference. The angular size of the field of view α is determined by the length of the lens and the size of the image detector utilized in the television camera. The total screen height a is a known parameter of the image detector and the coordinates of the image of any point B may be determined by computer image processing.

Further, FIGS. 8 and 9 illustrate angle measurements in only one axis, the Z-axis, with the objects rotated about the X-axis. Conversely, horizontal measurements in the image would correspond to measuring angles produced when rotating the objects 40, 41 and 42 about the Z-axis. As for the determination of the orientation of an object rotated about the Y-axis, the determination is readily obtained by determining the relative positions of two points on the image of object 41 from which their relative position would determine the Y-axis orientation. As illustrated in FIG. 9, it is apparent that object 40 is arranged vertically and that object 41 is rotated slightly about the Y-axis. Hence, the determination of the locations of corners c and d of object 41 would indicate the Y-axis orientation thereof.

Thus, as can be seen, it is the X and Z axis rotations which are difficult to measure with the techniques of the prior art while sensing along the Y-axis. Hence, it is the measurement of the X and Z axes rotations for which the present invention is suited. The application of one specular-dome reflector 10 would facilitate the measurement of angular orientation during rotation about the X and Z axes. Alternatively, the application of two properly arranged arcuate double reflectors 16 would facilitate the measurement of angular orientation during rotations about the X and Z axes.

Figure 10A:
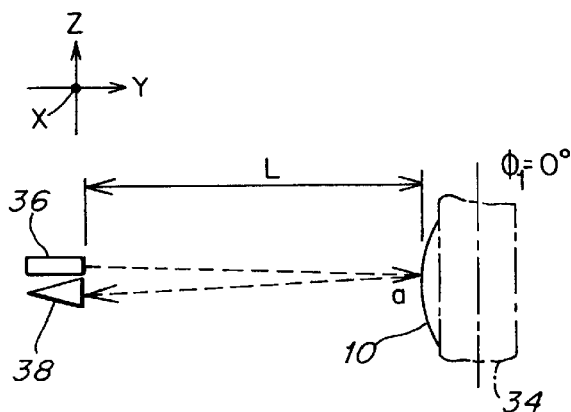
FIGS. 10A, 10B, 10C and 10D are graphical diagrams illustrating the determination of the angles of arrival of a reflected beam of light from a specular-dome reflector shown in three distinct rotated positions which will further aid in the explanation of the present invention.
Figure 10B:
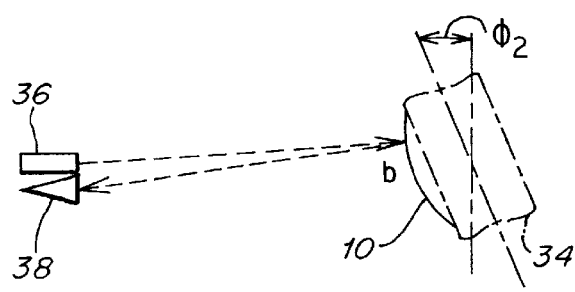
Figure 10C:
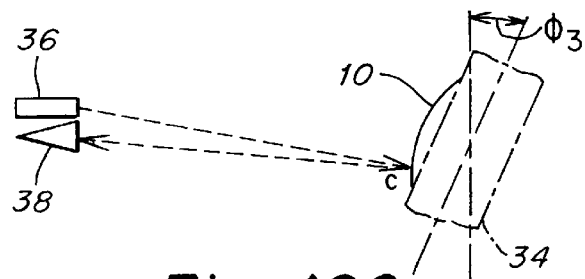
Figure 10D:
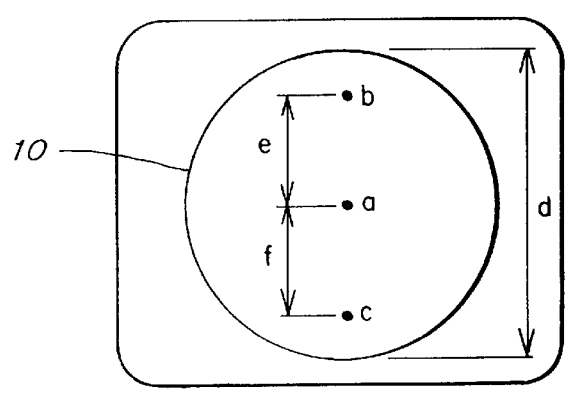

In referring now to FIGS. 10A, 10B, 10C and 10D, a method of utilization of the specular-dome reflector 10 can be seen. In FIGS. 10A, 10B and 10C, the object 34 (shown in phantom) can be seen illustrated in three different orientations with $\phi_1 = 0°$, $\phi_2 = +20°$ and $\phi_3 = -20°$. The angle $\phi$ thereby indicating a rotation of the object 34 about the X-axis. The object 34 is shown with a specular-dome reflector 10 coupled thereto to provide the reflection of a beam of light projected from the light source 36 and detected by the light sensor 38. The centroid 13 of reflection detected by the light sensor 38, corresponding to each angular orientation, is indicated by points a, b and c in FIGS. 10A–D. It is to be noted that only one centroid 13 of reflection is detected at a time corresponding to a specific angular orientation of the object 34. Thus, the distance between the centroids 13 of the reflections from point a, representing $\phi = 0°$, are indicated as lengths e and f and the total size of the specular-dome reflector 10 is indicated as length d.

Thus, the location of the centroids 13 of the reflections on the specular-dome reflector 10, specifically points a, b and c, can generally be represented by the variable X, wherein X is the point at which the surface normal bisects the beam of light from the light source 36 to X and from X to the light sensor 38. Therefore, X would represent the varying centroid 13 of reflection in correspondence to the angular orientation to which the object 34 is rotated. The mathematical relationship between the orientation of the object 34 and the location of varying point X is determined by geometry, although quite complex geometries.

However, it is always possible when orientation is specified to compute the point on the specular-dome reflector 10 which will be the centroid 13 of reflection. Various software programs are currently available in the industry for performing these geometric calculations. In using this approach, a table can then be generated by calculating the varying points of X for each of many different orientations and recording the orientations. Then, when the location of the centroid 13 of reflection is measured by the light sensor 38, the corresponding orientation is determined from the previously generated table.

Figure 11:
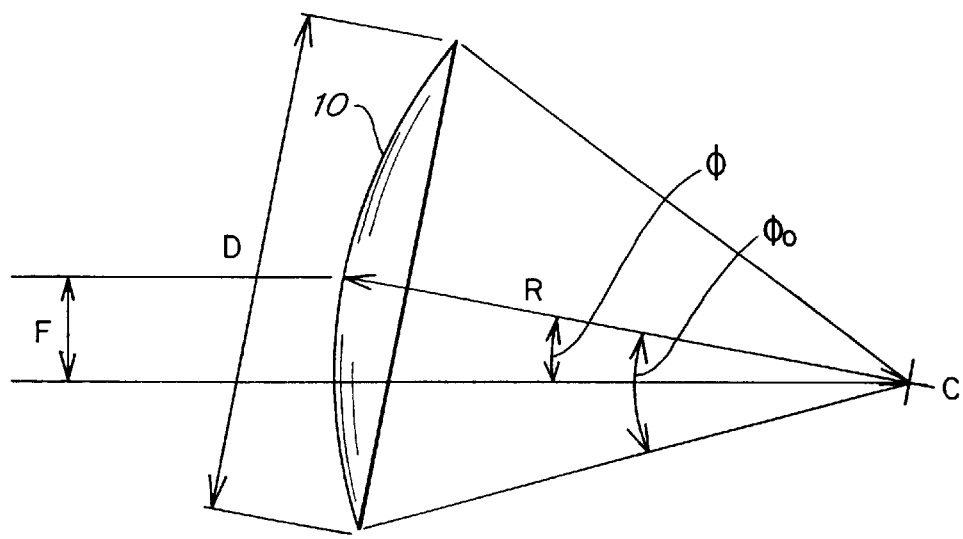
FIG. 11 is a graphical diagram illustrating the important dimensions utilized in determining the angle of arrival of a reflected beam of light in accordance with associated mathematical formulas which will aid in the explanation of the present invention.

When two simplifying conditions are obtained, the direct calculation becomes easily tractable. For tractable direct calculations to be possible, the required conditions are: (1) that the light source 36 and light sensor 38 be spatially positioned far from the specular-dome reflector 10 in relation to the size of the specular-dome reflector 10 (that is, L in FIG. 10A is large relative to D in FIG. 11); and (2) that the specular-dome reflector 10 has a nearly constant exterior curvature side 12. When these conditions are met, determination of the orientation of the object 34 from the centroid 13 of reflection detected by the light sensor 38, the angle of arrival reduces to the mathematical relationship as represented by:

$$\phi = \sin^{-1}\left(\frac{F}{R}\right) = \sin^{-1}\left(\frac{F2\sin(\phi_0)}{D}\right) = \sin^{-1}\left(\frac{f}{d}2\sin(\phi_0)\right) \simeq 2\phi_0 \frac{f}{d}$$

wherein (referring to FIGS. 10A–D and 11):

φ is the orientation angle to be measured;

R is the radius of curvature of the specular-dome reflector 10.;

F is the linear displacement of the centroid 13 of reflection detected by the light sensor 38;

$\phi_0$ is the half-angle subtended by the specular-dome reflector 10;

D is the length of the front face of the specular-dome reflector 10;

f is the displacement of the centroid 13 of reflection detected by the light sensor 38; and d is the apparent length of the front face of the specular-dome reflector 10 detected by the light sensor 38.

The determination of the angles of arrival of reflections from a retro reflector are determined in a similar manner as discussed above. Hence, the angles of arrival determined from a combination of the specular-dome reflector 10 or arcuate double reflector 16 in combination with a retro reflector 14 are similarly obtained wherein the distance between the points of reflection is determined by obtaining the angles of arrival in accordance with the above described procedure.

Figure 12:
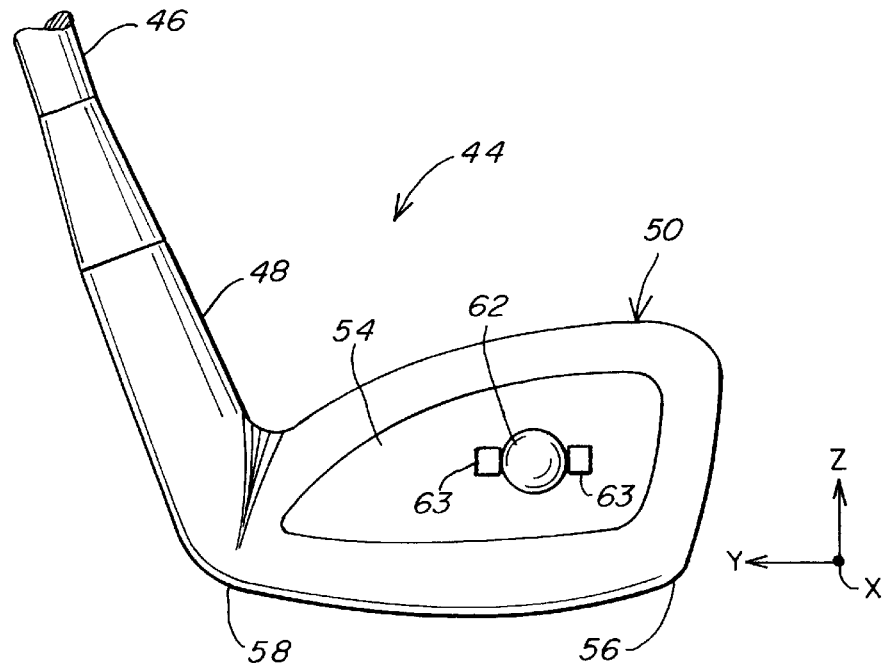
FIGS. 12 and 13 are respective back and side elevational views of a golf club illustrating the shaft, the hosel and the head having a face and back in their relative positions to each other along with orientation dependent reflectors positioned thereon.
Figure 13:
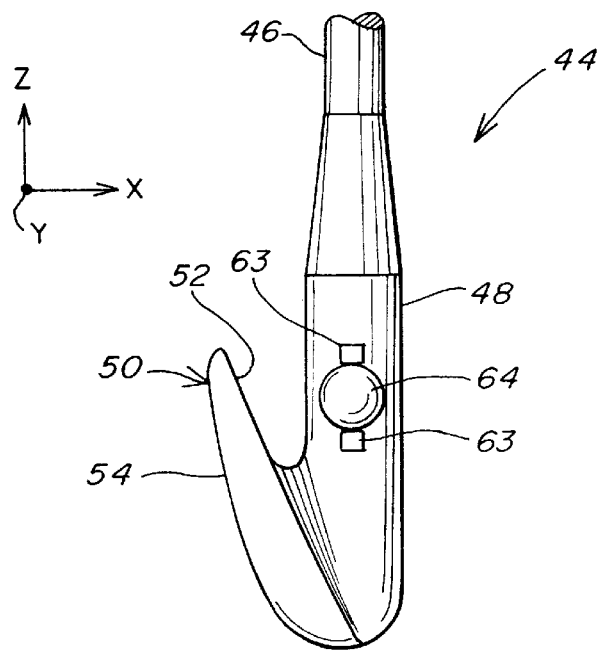

In referring now to FIGS. 12 and 13, an embodiment comprising the placing of combined orientation dependent and independent reflectors on a golf club 44 is illustrated. The golf club 44 can be seen to include a shaft 46 a hosel 48 and a head 50. The hosel 48 and head 50 are integral and the shaft 46 is coupled to the hosel 48. The head 50 further includes a face 52, a back 54, a toe 56 and a heel 58. The head 50 can be seen to further include orientation dependent reflectors, in the form of specular-dome reflectors, 62 and 64. The specular-dome reflectors 62 and 64 are shown further having orientation independent reflectors 63 coupled respectively thereto. The specular-dome reflector 62 facilitates angular orientation measurements for "pitch" and "yaw" in the Y and Z axes respectively. In referring to FIG. 13, the specular-dome reflector 64 facilitates angular orientation measurements in the X-axis for "lie".

Figure 14:
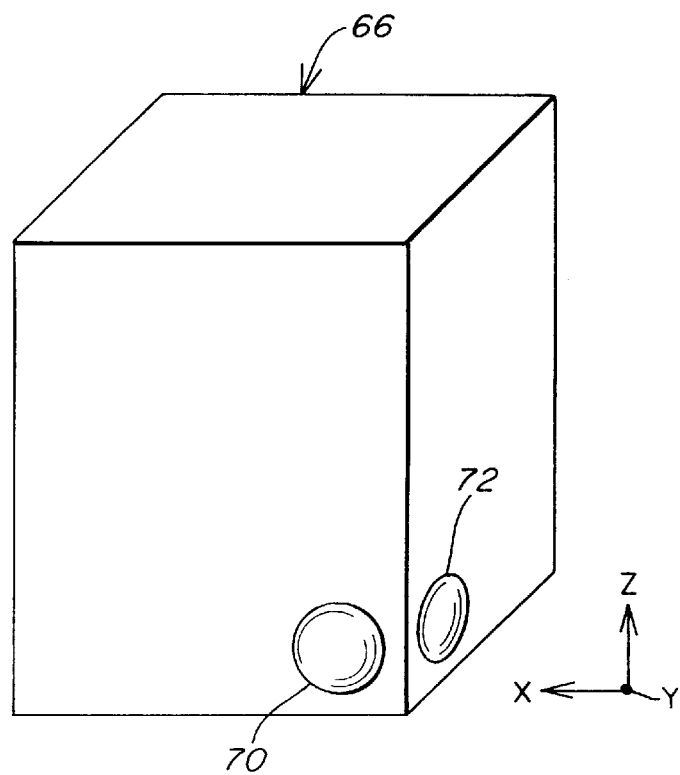
FIG. 14 is a perspective view of a package having orientation dependent reflectors positioned thereon.

Further, in referring to FIG. 14, an alternate application embodiment can be seen utilizing the orientation dependent reflection means of the present invention in the form of specular-dome reflectors 10. FIG. 14 illustrates a package 66 being moved along and about in some stage of a multi-part process wherein angular orientation is important. The specular-dome reflectors 70 and 72, as positioned in FIG. 14, would provide angular orientation measurement in the X and Z axes and the Y and Z axes, respectively.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An apparatus for optically reflecting light from a light source to facilitate the determination of the angular orientation of an object throughout a range of rotation about at least one axis of rotation, said apparatus comprising in combination:

an orientation dependent reflection means for providing an optical reflection that varies in position in correspondence to specific angular orientations about the axis of rotation; and an orientation independent reflection means for providing an optical reflection that corresponds to a constant point of reference, said orientation independent reflection means being coupled to said orientation dependent reflection means such that both of said reflection means provide optical reflections that vary in distances from each other in correspondence to specific angular orientations, whereby said apparatus is capable of being fixedly positioned on the object so to remain in optical communication with the light source throughout the range of rotation about the axis of rotation.

2. The apparatus as recited in claim 1, wherein said orientation dependent reflection means is comprised of a specular-dome reflector having an exterior curvature side facing the light source, whereby said specular-dome reflector facilitates the determination of the angular orientation of the object relative to two axes of rotation.

3. The apparatus as recited in claim 1, wherein said orientation dependent reflection means is comprised of an arcuate double reflector, said arcuate double reflector including an elongated body having an exterior side, and first and second angled portions having respective first and second specular reflecting surfaces thereon coupled to said exterior side such that said first and second specular reflecting surfaces angularly oppose each other and converge to form a right angle therebetween, whereby said first and second specular reflecting surfaces cooperate to optically reflect light so to facilitate the determination of angular orientation relative to an axis of rotation extending perpendicular to said elongated body.

4. The apparatus as recited in claim 3, wherein said elongated body and said first and second angled portions of said arcuate double reflector are integral.

5. The apparatus as recited in claim 1, wherein said orientation independent reflection means is comprised of a retro reflector, whereby said retro reflector facilitates reflecting light back towards the light source parallel to the direction of arrival of the light.

6. An optical system for determining the angular orientation of an object throughout a range of rotation about at least one axis of rotation, said optical system comprising in combination:

an orientation dependent reflection means for providing an optical reflection that varies in position in correspondence to specific angular orientations about the axis of rotation, said orientation dependent reflection means capable of being coupled to the object;

a light source means for providing an optically detectable beam of light, said light source means being positioned at a distance from said orientation dependent reflection means; and a light sensing means for detecting optical reflections on said orientation dependent reflection means so to facilitate the determination of angular orientation, said light sensing means being positioned adjacent said light source means, whereby said light source means projects the optically detectable beam of light towards said orientation dependent reflection means whereupon points of reflection are determined thereon by said light sensing means and the angular orientation of the object is determined.

7. The optical system as recited in claim 6, further comprising an orientation independent reflection means for providing an optical reflection that corresponds to a constant point of reference, said orientation independent reflection means being fixedly coupled to said orientation dependent reflection means such that both of said reflection means simultaneously provide optical reflections that vary in distances from each other in correspondence to specific angular orientations.

8. The optical system as recited in claim 6, wherein said orientation dependent reflection means is comprised of a specular-dome reflector having an exterior curvature side facing said light source means, whereby said specular-dome reflector is capable of facilitating the determination of the angular orientation of an object relative to two axes of rotation.

9. The optical system as recited in claim 6, wherein said orientation dependent reflection means is comprised of an arcuate double reflector, said arcuate double reflector including an elongated body having an exterior side, and first and second angled portions having respective first and second specular reflecting surfaces thereon coupled to said exterior side such that said first and second specular reflecting surfaces angularly oppose each other and converge to form a right angle therebetween, whereby said first and second specular reflecting surfaces cooperate to optically reflect the beam of light so to facilitate the determination of angular orientation relative to an axis of rotation extending perpendicular to said elongated body.

10. The optical system as recited in claim 7, wherein said orientation independent reflection means is comprised of a retro reflector, whereby said retro reflector facilitates reflecting the beam of light back towards said light source means parallel to the direction of arrival of the beam of light.

11. The optical system as recited in claim 6, wherein said light sensing means determines the point of reflection on said orientation dependent reflection means by detecting the angle of arrival of the reflected optically detectable beam of light.

12. A method for optically determining the angular orientation of an object throughout a range of rotation about at least one axis of rotation, said method comprising the steps of:

providing an optically detectable beam of light;

providing an orientation dependent reflection means for producing an optical reflection that varies in position in correspondence to specific angular orientations about the axis of rotation, said orientation dependent reflection means capable of being coupled to the object;

detecting reflections on said orientation dependent reflection means from a position adjacent to where the projected beam of light is produced;

determining the angular orientation of an object throughout a range of rotation about at least one axis of rotation from the optically detectable beam of light being reflected from said orientation dependent reflection means.

13. The method as recited in claim 12, wherein the step of determining the angular orientation of an object throughout a range of rotation about at least one axis of rotation is further comprised of the steps of:

determining the angle of arrival of the optically detectable beam of light reflected from said orientation dependent reflection means;

determining the point of reflection on said orientation dependent reflection means based upon the determined angle of arrival; and determining the angular orientation of an object throughout a range of rotation about at least one axis of rotation based upon the determined points of reflection.

14. The method as recited in claim 12, further comprising the steps of:

providing an orientation independent reflection means for producing an optical reflection that corresponds to a constant point of reference, said orientation independent reflection means being coupled to said orientation dependent reflection means such that both of said reflection means provide optical reflections;

detecting the optically detectable beam of light being reflected from said orientation independent reflection means;

determining the distance of separation between the reflection on said orientation independent reflection means and the point of reflection on said orientation dependent reflection means; and determining the absolute angular orientation of an object throughout a range of rotation about at least one axis of rotation based upon the determined distance of separation.

15. The method as recited in claim 12, wherein said orientation dependent reflection means is comprised of a specular-dome reflector having an exterior curvature side facing said light source means, whereby said specular-dome reflector is capable of facilitating the determination of the angular orientation of an object relative to two axes of rotation.

16. The method as recited in claim 12, wherein said orientation dependent reflection means is comprised of an arcuate double reflector, said arcuate double reflector including an elongated body having an exterior side, and first and second angled portions having respective first and second specular reflecting surfaces thereon coupled to said exterior side such that said first and second specular reflecting surfaces angularly oppose each other and converge to form a right angle therebetween, whereby said first and second specular reflecting surfaces cooperate to optically reflect the beam of light so to facilitate the determination of angular orientation relative to an axis of rotation extending perpendicular to said elongated body.

17. The method as recited in claim 14, wherein said orientation independent reflection means is comprised of a retro reflector, whereby said retro reflector facilitates reflecting the beam of light back towards said light source parallel to the direction of arrival of the beam of light.

18. The method as recited in claim 12, wherein said step of determining the angular orientation of an object throughout a range of rotation about at least one axis of rotation from the optically detectable beam of light being reflected from said orientation dependent reflection means is further comprised of the steps of:

providing a light filter means for modifying a sensible property of the light such that the sensible property covaries with the centroid of reflection; and detecting the sensible property of the detectable beam of light being reflected from the orientation dependent reflection means.

19. The method as recited in claim 18, wherein the sensible property of the detectable beam of light is in the form of polarization, whereby the polarization angle is detected therefrom.

20. The method as recited in claim 18, wherein the sensible property of the detectable beam of light is in the form of color balance, whereby the color balance is detected therefrom.

* * * * *